March 17, 1942.  N. TAYLOR  2,276,524
FISHING POLE
Filed July 6, 1939
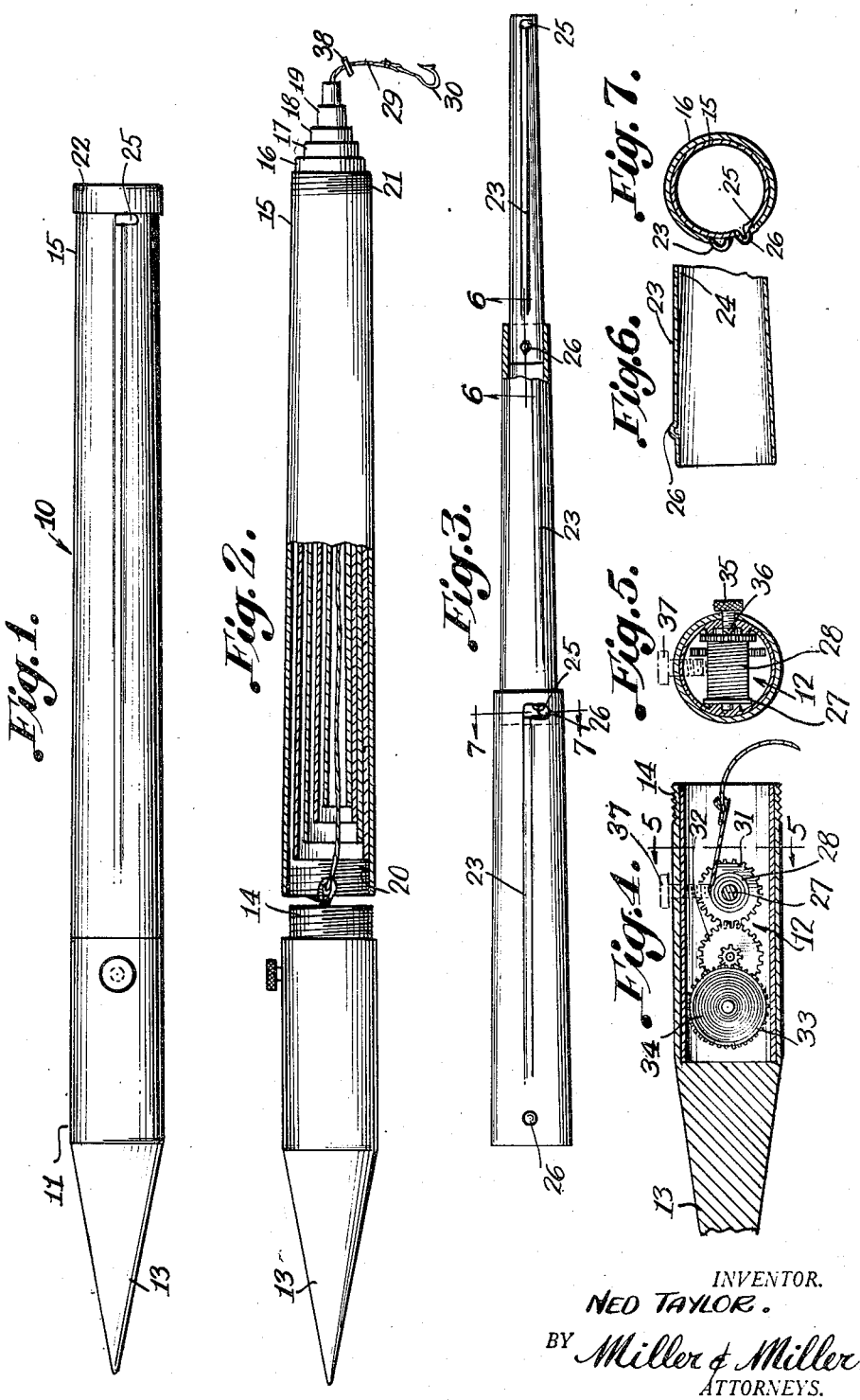
INVENTOR.
NED TAYLOR.
BY Miller & Miller.
ATTORNEYS.

Patented Mar. 17, 1942

2,276,524

UNITED STATES PATENT OFFICE 2,276,524

FISHING POLE

Ned Taylor, Georgiana, Ala.

Application July 6, 1939, Serial No. 283,083

1 Claim. (Cl. 43—18)

This invention relates to a fishing pole and has for an object to provide an improved telescopic fishing pole and automatic line adjusting device for automatically drawing in the line when the pole is collapsed.

A further object of this invention is to provide a fishing pole which may be collapsed to a length that it may be conveniently fitted in a pocket and may be made of a size that may be extended to any desired length.

A further object of this invention is to provide a telescopic fishing pole made of a plurality of telescopic sleeves which may be locked to each other in extended position by merely rotating one sleeve relative to the other and may be unlocked for telescoping within each other by merely reversing the process.

A further object of this invention is to provide a line releasing device which will permit the line to be withdrawn to any desired length and then may be braked to hold it at any such length, which when unbraked will automatically reel in the line as the sleeve lengths of the pole are telescoped together.

A still further object is to provide an improved means for latching the sleeve sections in extended position.

With the foregoing and other objects in view, this invention comprises the construction, combination, and arrangement of parts hereinafter disclosed, claimed and illustrated on the accompanying drawing:

In this drawing:

Fig. 1 is an elevational view of the fishing pole in collapsed and telescoped position.

Fig. 2 is a partial sectional view of the pole in a partly exploded position.

Fig. 3 is a partly sectional and partly elevational view of a portion of the pole in an extended position.

Fig. 4 is a sectional view through the butt showing the reel therein.

Fig. 5 is a sectional view at line 5—5 of Fig. 4.

Fig. 6 is a sectional view on line 6—6 of Fig. 3.

Fig. 7 is a sectional view on line 7—7 of Fig. 3.

There is shown at 10 the fishing rod of this invention consisting of a butt 11 within which is mounted a fishing line reel 12 and having one end formed into a spike 13 while the other end is provided with a threaded neck 14. The pole also includes a number of slightly tapered telescopic sleeves, 15, 16, 17, 18 and 19. More or less of these sleeves 16 to 19 may be provided depending on the length and size of fishing pole that is desired.

The base sleeve 15 is internally threaded as at 20 at one end for attachment to the threaded neck 14 of the butt 11. The base sleeve 15 is externally threaded at its other end 21 to receive a threaded cap 22 thereover when the pole is telescoped with the remaining sleeves within the base sleeve.

Each of the sleeves 15 to 19 is provided with a longitudinally extending ridge 23 providing an internal groove 24 extending slightly less than the length of the sleeve. At the smaller end of each sleeve the groove 24 is connected to a circumferentially extending latch hole 25, while at the larger end of each sleeve 16 to 19 there is provided a headed tit 26.

This headed tit 26 is placed in alignment with the ridge 23 which stops just short thereof. The latch hole 25 is spaced slightly from the end, thus preventing the telescopic sleeves from being separated. The headed tit 26 is of such a height that when the sleeves are being extended the tit 26 rides within the groove 24 until it reaches the latch hole 25 whereupon a slight rotation of the sleeves places each section in a locking position relative to each other, and prevents either further separation or the sections from telescoping.

The reel 12 includes a drum 27 on which the line 28 is secured at one end, being wound therearound and then extending through the inside of the various sleeves and terminating at 29 to which may be secured a fish hook 30.

The drum 27 is provided with a train of gears 31 and 32 meshed to a spring wound gear 33 having a coil spring 34 therein. Threaded through the butt 11 is a thumb screw 35 whose inner end 36 abuts the drum 27 and when tightened acts as a brake to prevent rotation thereof. As an alternative, another thumb screw 37 may be provided threaded through the butt 11 and contacting against the line 28.

In operation, the pole 10 can be carried in the pocket, concealed if desired in the position shown in Fig. 1 with the cap 22 preventing any of the inner sleeves from extending thereout. When ready to fish, the cap 22 is removed permitting the sleeves 15 to 19 to be extended. Each sleeve is drawn outwardly with its tit riding along the inner groove of the outer sleeve until it reaches the position where it may be rotated into the latching slot 25. An abutment 38 on the line 28 near the hook 29 causes the line 28 to continue to extend beyond the inner most sleeve 19 as the pole is being extended, the thumb screw 35 having first been operated to release the brake on the line drum 27. When each sleeve of the pole has been fully extended and locked by partial rotation, the line 28 may be then drawn further through the pole until the desired length of line has been drawn out from the drum 27 whereupon the thumb screw 35 is tightened to hold the drum 27 against rotation by the gear train 32 and spring 34. If desired, the pointed end 13 of the butt 11 may be inserted into the ground to hold the pole upright as when rebaiting the hook 30.

When the fishing operation is finished and it is desired to reassemble the pole, the thumb screw 35 is loosened to release the brake on the drum 27 permitting the spring 34 to reel in the line, then the sleeve sections are rotated in the opposite direction used in the locking process, thus permitting the sleeves to be telescoped together and allow the spring drum 33 to automatically reel in the line. The cap 22 is then threaded over the threads 21 on the base sleeve 15 thereby holding the inner sleeves against accidental extension.

The novel features and the operation of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

I claim:

A telescopic fishing pole including a plurality of tapered telescopic sleeves, each sleeve having a ridge extending longitudinally thereof but stopping short of each end thereof and providing an internal groove, a latching slot adjacent the smaller end of each sleeve circumferentially extending from said ridge and a headed tit aligned with said longitudinal ridge adjacent the larger end, said headed tit being adapted to ride within said longitudinal groove to the position of said latching slot and then be circumferentially rotated into a latch engagement therewith, a base sleeve, a butt, means for attaching said base means to said butt, a line reel attached to said butt, said line reel having a line wound thereon and extending through the inside of said sleeves, means normally urging said line reel to wind up the line and brake means for holding said line reel in any position, whereby when said pole is telescoped together and said line reel brake released the line is automatically wound on said line reel.

NED TAYLOR.